United States Patent
Hallowell

(10) Patent No.: US 10,001,276 B2
(45) Date of Patent: Jun. 19, 2018

(54) SAFETY DEVICE FOR CATALYTIC CONVERTER

(71) Applicant: Biomass Controls, LLC, Putnam, CT (US)

(72) Inventor: Jeffrey R. Hallowell, Woodstock, CT (US)

(73) Assignee: Biomass Controls, LLC, Putnam, CT (US)

( * ) Notice: Subject to any disclaimer, the term of this patent is extended or adjusted under 35 U.S.C. 154(b) by 0 days. days.

(21) Appl. No.: 15/622,606

(22) Filed: Jun. 14, 2017

(65) Prior Publication Data

US 2017/0284664 A1    Oct. 5, 2017

Related U.S. Application Data

(63) Continuation of application No. 13/914,832, filed on Jun. 11, 2013, now Pat. No. 9,709,267.

(60) Provisional application No. 61/658,749, filed on Jun. 12, 2012.

(51) Int. Cl.
*B23P 19/00* (2006.01)
*F23J 13/00* (2006.01)
*F23B 90/08* (2011.01)

(52) U.S. Cl.
CPC ............... *F23J 13/00* (2013.01); *B23P 19/00* (2013.01); *F23B 90/08* (2013.01); *F23J 2213/70* (2013.01); *F23J 2219/10* (2013.01); *Y10T 29/49437* (2015.01)

(58) Field of Classification Search
CPC .................................................. B01D 53/9431
See application file for complete search history.

(56) References Cited

U.S. PATENT DOCUMENTS

| | | | |
|---|---|---|---|
| 2,811,095 A | 10/1957 | Moran | 98/62 |
| 3,056,467 A | 10/1962 | Ravich | 23/277 |
| 4,373,452 A | 2/1983 | Van Dewoestine | 110/203 |
| 4,476,852 A | 10/1984 | Lee et al. | 126/289 |
| 4,550,668 A | 11/1985 | Piontkowski | 110/210 |
| 5,295,448 A | 3/1994 | Vickery | 110/214 |
| 6,213,118 B1 | 4/2001 | Adcock et al. | 126/312 |
| 6,347,511 B1 * | 2/2002 | Haines | B01D 53/9431 422/169 |
| 6,543,437 B1 | 4/2003 | Luu et al. | 126/85 B |
| 2004/0173203 A1 | 9/2004 | Henry et al. | 126/512 |
| 2011/0300494 A1 | 12/2011 | Masen et al. | 431/12 |
| 2012/0116589 A1 | 5/2012 | Schneider et al. | 700/274 |
| 2013/0188329 A1 | 7/2013 | Chang et al. | 361/836 |

OTHER PUBLICATIONS

Ranco, "Ranco ETC Commercial Temperature Controls," p. D71, Jan. 4, 2002.
Honeywell International, Inc., "L4006E1000/U," product web page, 2 pages, 2006.

(Continued)

*Primary Examiner* — Jyoti Nagpaul
(74) *Attorney, Agent, or Firm* — Sunstein Kann Murphy & Timbers LLP

(57) ABSTRACT

Safety devices prevent packaged catalytic converters from being expelled from stacks, or at least reduce the velocity with which such a package may be expelled, in case of an explosion in a bio-fueled appliance, such as a wood-burning stove.

9 Claims, 11 Drawing Sheets

(56) References Cited

OTHER PUBLICATIONS

Dwyer Instruments, Inc., Love Temperature Measurement Product Brochure, www. Love-controls.com, 4 pages, 2008.
Jag, "Temperature Switch," *Hewitt Industries of Los Angeles,* Drawing No. 021-113 C, 1 page, May 31, 2011.
Northwest Manufacturing, Inc., "Economical Heat Efficiency," The WoodMaster 3300 wood furnace, 1 page, Nov. 17, 2011.
Alternative Heating & Supplies, "Alternative Heating & Supplies Be Self-Sufficient," www.AltHeatSupply.com, Version 14, 32 pages, Aug. 2, 2012.
Central Boiler, Inc. "Connect to Your Furnace Anywhere You Go, Fire Star II," 2 pages, Mar. 6, 2013.
International Searching Authority, International Search Report— International Application No. PCT/US2013/045065 dated Nov. 18, 2013, together with the Written Opinion of the International Searching Authority, 16 pages.

\* cited by examiner

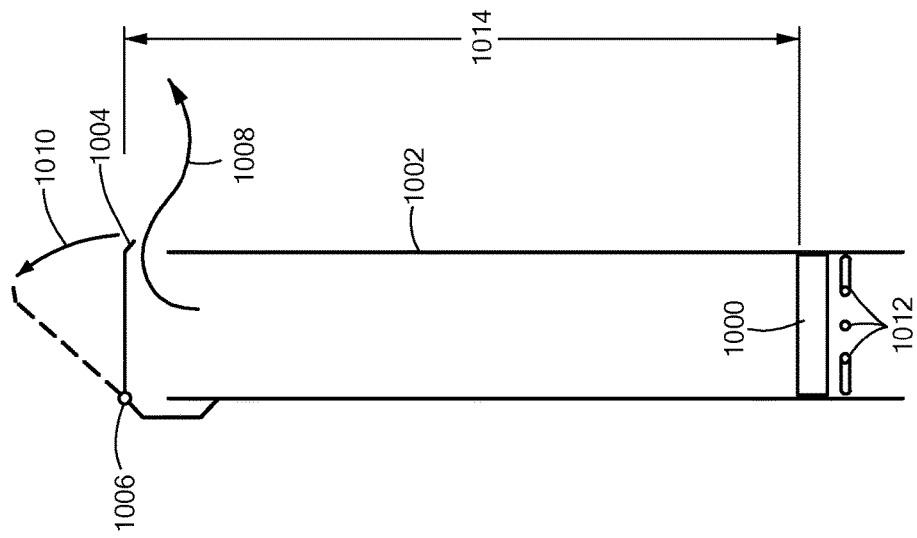
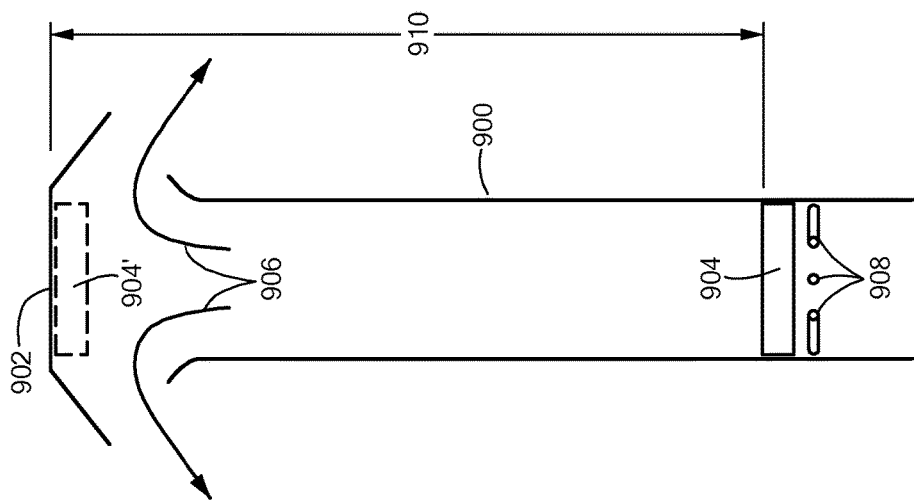

SAFETY DEVICE FOR CATALYTIC CONVERTER

CROSS REFERENCE TO RELATED APPLICATIONS

This application is a continuation of U.S. patent application Ser. No. 13/914,832, filed Jun. 11, 2013, which claims the benefit of U.S. Provisional Patent Application No. 61/658,749, filed Jun. 12, 2012, titled "Safety Device for Catalytic Converter," the entire contents of each of which are hereby incorporated by reference herein, for all purposes.

TECHNICAL FIELD

The present invention relates to catalytic converters for biofuel-fired boilers and, more particularly, to safety devices for such catalytic converters.

BACKGROUND ART

United States Environmental Protection Agency (EPA) regulations limit the amount of particulate matter, measured in grams per hour, that may be emitted by a woodstove or wood-fired boiler. Catalytic converters are frequently used to clean wood-fired exhaust. A catalytic converter essentially burns unburned fuel (smoke) from the fire before it exits a flue (smoke stack).

Conventional catalytic converters often include ribbons of metal, typically thin (such as about 0.004 inch thick) stainless steel, that are coated with one or more catalysts. The ribbons are often corrugated or "herringbone" shaped and then wound into spirals or folded back and forth. The wound or folded ribbons are then bound, such as by stainless steel rings, to maintain a desired shape (typically round) and diameter (slightly less than the inside diameter of a smoke stack). Each ring has an upper lip and a lower lip to prevent the wound or folded ribbon from sliding out of the ring. A ring with one or more such ribbons is referred to herein as a packaged catalytic converter.

One or more such packaged catalytic converters may be placed inside a stack, such that the axis of each ring is aligned with the central axis of the stack. The ribbons are oriented such that their surfaces are parallel with the axis of the stack and, therefore, with the direction of flow of the smoke.

The outside diameter of a packaged catalytic converter is typically slightly less than the inside diameter of a stack to facilitate installing the catalytic converter into the stack and to accommodate thermal expansion of the ring. Sometimes the gap between the outside diameter of the ring and the inside diameter of the stack is packed with a compressible heat-resistant sealant. Consequently, smoke is prevented from passing around the packaged catalytic converter and, instead, passes over the surfaces of the ribbons. The sealant typically does not, however, provide much structural fixation of the ring to the stack.

A typical packaged catalytic converter weighs about 5 pounds, although the weight can vary, based on its diameter, length, material thickness, etc. Nevertheless, a typical packaged catalytic converter has a substantial mass packed into a relatively small volume, and the package (ring) has a hard outer surface.

Occasionally, small or large explosions occur within wood-burning appliances, particularly in gasification appliances. Such an explosion can propel a packaged catalytic converter out of the stack. Essentially, the stack becomes a canon barrel, and the packaged catalytic converter becomes a projectile. Catalytic converter packages have been known to be projected about 25 feet into the air above a wood-burning appliance. A hot catalytic converter package ejected from a stack can cause a fire if it lands on dry grass, a wood shingled roof or other flammable material. Furthermore, a falling catalytic converter can injure a person or animal or cause impact damage to property. Catalytic converter packages disposed within stacks can, therefore, pose safety problems.

SUMMARY OF EMBODIMENTS

An embodiment of the present invention provides a safety device for a catalytic converter. The safety device includes a smoke pipe. The smoke pipe is configured to be attachable to an exhaust from a bio-fuel fired appliance. The smoke pipe includes a wall. The wall defines a plurality of apertures (ports) through the wall of the smoke pipe.

Optionally, at least a first portion of the plurality of apertures is defined along a first line parallel to a longitudinal axis of the smoke pipe.

A second portion of the plurality of apertures may be defined along a second line. The second line may be spaced apart from, and parallel to, the first line. The apertures of the second portion of the plurality of apertures may be staggered along the second line, with respect to the apertures of the first portion of the plurality of apertures.

Each aperture may have a diameter of about ½ inch to about 3 inches.

The smoke pipe may include an inside wall that defines an interior. The safety device may also include at least one first bar attached to the smoke pipe. The at least one first bar extends inward of the inside wall and at least partially into the interior of the smoke pipe. The at least one first bar may be spaced at least about 6 inches away from its nearest aperture, as measured along a longitudinal axis of the smoke pipe.

The safety device may also include at least one second bar attached to the smoke pipe and extending inward of the inside wall of the smoke pipe and at least partially into the interior. The apertures are located between the first at least one bar and the second at least one bar, as viewed along the longitudinal axis of the smoke pipe. The at least one second bar may be spaced at least about two feet away from its nearest aperture, as measured along the longitudinal axis of the smoke pipe.

The safety device may also include a catalytic converter disposed in the interior of the smoke pipe, between the at least one first bar and the at least one second bar.

At least one of the first bars may include a temperature sensor.

Another embodiment of the present invention provides a safety device for a catalytic converter. The safety device includes a catalytic converter configured for disposition within an interior of a smoke pipe extending from a stationary bio-fuel fired device. The safety device may also include a bracket hingedly attached to the catalytic converter. The bracket may be configured to be attached to an interior wall of the smoke pipe. Once the bracket is attached to the interior wall, the catalytic converter is hingedly attached to the interior wall.

The safety device may also include the smoke pipe. The bracket may be attached to the interior wall of the smoke pipe.

Yet another embodiment of the present invention provides a safety device for a catalytic converter. The safety device includes a smoke pipe. The smoke pipe has an inlet, an outlet and a middle portion between the inlet and the outlet. The inlet defines an internal cross-sectional area, and the outlet defines an internal cross-sectional area. The middle portion defines an internal cross-sectional area greater than the inlet internal cross-sectional area and greater than the outlet internal cross-sectional area.

The middle portion may define an internal cross-sectional area greater than twice the inlet internal cross-sectional area.

The smoke pipe may include an inside wall and define an interior. The safety device may also include at least one first bar attached to the smoke pipe and extending inward of the inside wall and at least partially into the interior. The number of bars and their positions within the interior may be selected so as to define no space within the interior through which an object having a dimension equal to the largest inside diameter of the inlet can pass from the from the inlet to the outlet.

The safety device may include a second smoke pipe that includes an inside wall defining an interior. The second smoke pipe may be in communication with the inlet. At least one second bar may be attached to the second smoke pipe and extend inward of the inside wall and at least partially into the interior.

A catalytic converter may be disposed in the interior of the second smoke pipe, between the at least one first bar and the at least one second bar.

An embodiment of the present invention provides a safety device for a catalytic converter. The safety device includes a smoke pipe that includes an inside wall and that defines an interior. At least one first bar is attached to the smoke pipe and extends inward of the inside wall and at least partially into the interior. At least one second bar is attached to the smoke pipe and extends inward of the inside wall and at least partially into the interior. The at least one second bar is disposed a distance away from the at least one first bar, as measured along a longitudinal axis of the smoke pipe. At least one third bar is attached to the smoke pipe and extends inward of the inside wall and at least partially into the interior. The at least one third bar is disposed between the at least one first bar and the at least one second bar. The at least one third bar is laterally off-center within the interior.

The safety device may also include a catalytic converter disposed in the interior, between the at least one second bar and the at least one third bar.

Another embodiment of the present invention provides a method for mitigating damage caused by a catalytic converter driven within a smoke pipe as a result of an explosion. The method includes attaching a cap to an exhaust end of the smoke pipe. The cap is configured to withstand an expected impact from the driven catalytic converter as a result of the explosion.

Optionally, the method may include attaching at least one bar to the smoke pipe, such that the at least one bar extends inward of an inside wall and at least partially into an interior of the smoke pipe. The at least one bar is disposed at least four feet from the cap, as measured along a longitudinal axis of the smoke pipe.

The cap may include a pivoted portion.

Yet another embodiment of the present invention provides a catalytic converter package. The catalytic converter package includes a tube defining an interior. One end of the tube defines a tube opening having an inside diameter. An inwardly-oriented lip is attached along at least a portion of a circumference proximate the other end of the tube. The lip defines a lip opening into the interior of the tube. The lip opening has an inside diameter less than the inside diameter of the tube opening. A catalyst is configured to promote combustion of at least some exhaust from a bio-fuel fire. The catalyst is releasably disposed within the interior of the tube. The catalyst is configured, as disposed in the interior of the tube, to have an outside diameter larger than the inside diameter of the lip opening, but less than the inside diameter of the tube opening. The catalyst is releasable out the tube opening, without altering the outside diameter of the catalyst.

The catalyst may include a spiral-wound ribbon.

BRIEF DESCRIPTION OF THE DRAWINGS

The invention will be more fully understood by referring to the following Detailed Description of Specific Embodiments in conjunction with the Drawings, of which:

FIGS. 9 and 10 are schematic longitudinal cross-sectional views of two stacks equipped with safety device caps, according to two other embodiments of the present invention.

DETAILED DESCRIPTION OF SPECIFIC EMBODIMENTS

In accordance with preferred embodiments of the present invention, methods and apparatus are disclosed for preventing a packaged catalytic converter from being expelled from a stack, or at least reducing the velocity with which such a package may be expelled, in case of an explosion in a bio-fuel fired appliance or the like.

Bio-fuel here means a fuel that is in some way derived from biomass, including solid biomass, liquid fuels and bio-gases. Biomass, a renewable energy source, is biological material from living, or recently living, organisms, such as wood, waste, algae, (hydrogen) gas and alcohol fuels. Exemplary solid biofuels include wood and wood pellets. Bio-ethanol is an alcohol made by fermenting sugar components of plant materials; it is made mostly from sugar and starch crops. Some embodiments of the present invention may be used with conventional fossil fuels, such as coal, oil or oil-derived fuels. Thus, where appropriate, the term bio-fuel includes fossil fuels.

Figure 1:
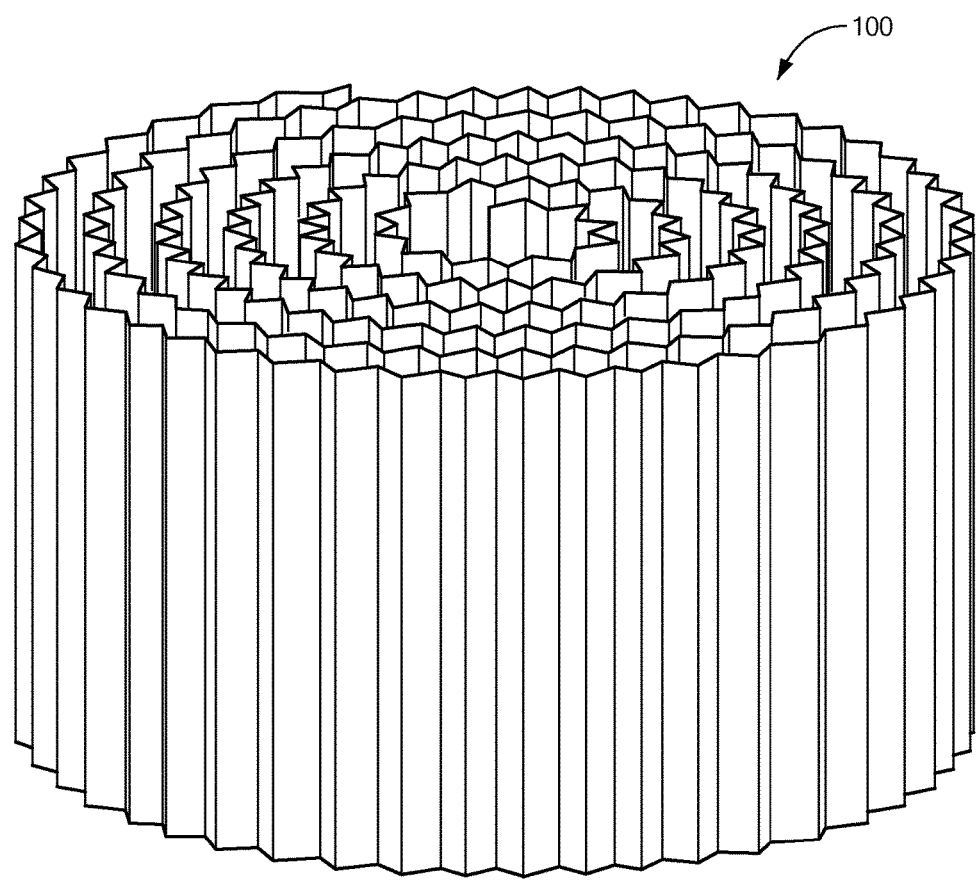
FIG. 1 is a perspective view of a typical conventional wound catalytic converter ribbon, according to the prior art.
Figure 2:
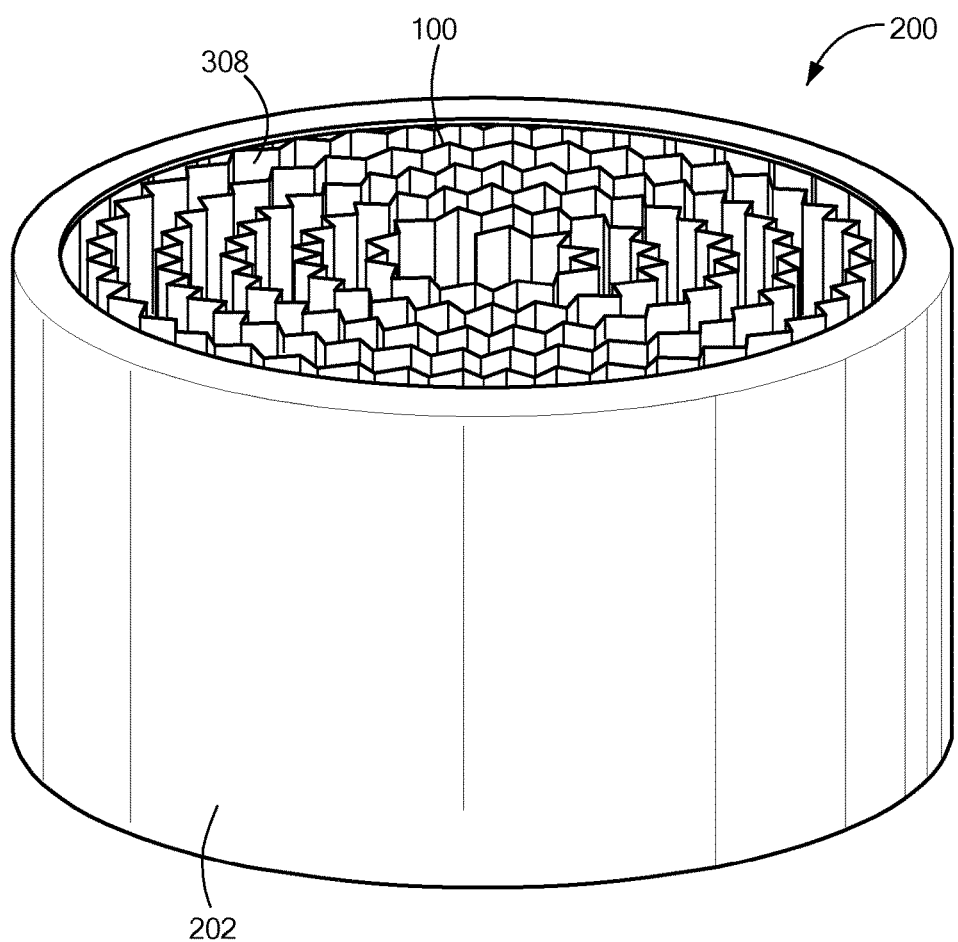
FIG. 2 is a perspective view of a typical conventional packaged catalytic converter, according to the prior art.
Figure 3:
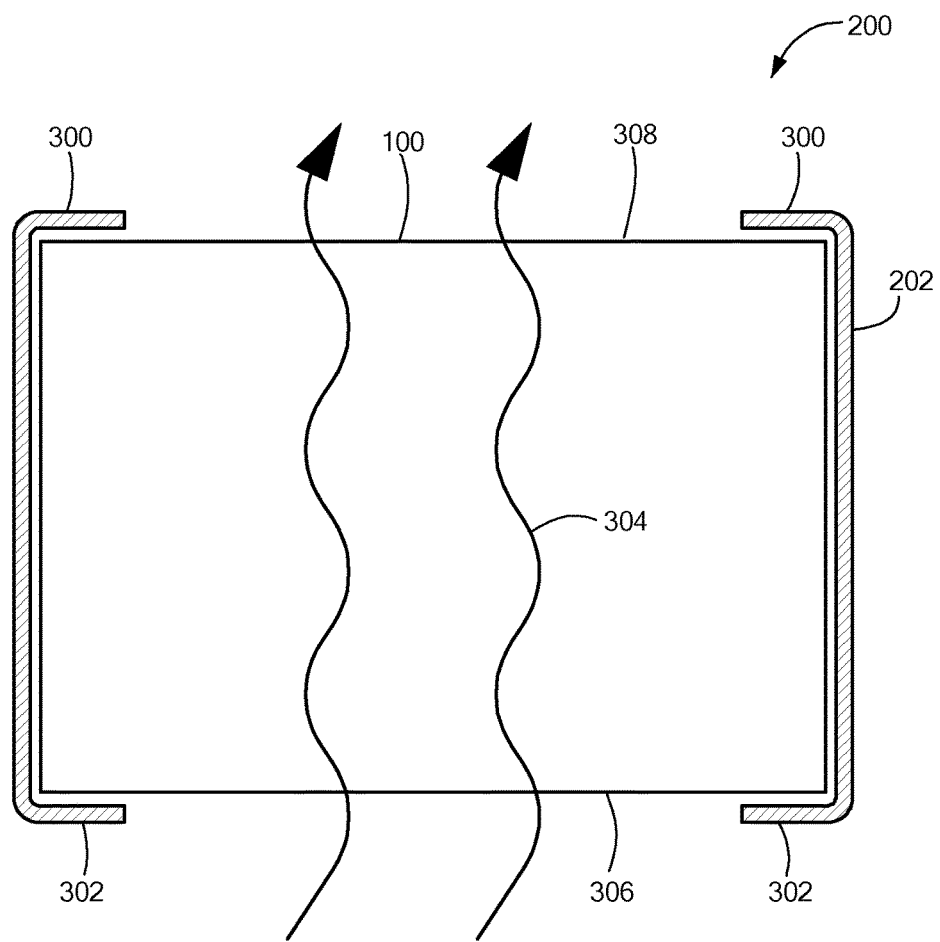
FIG. 3 is a schematic longitudinal cross-sectional view of the packaged catalytic converter of FIG. 2.

FIG. 1 is a perspective view of a typical conventional wound catalytic converter ribbon 100, and FIG. 2 is a perspective view of a typical conventional packaged catalytic converter 200 that includes a ring 202 and a ribbon 100. FIG. 3 is a schematic longitudinal cross-sectional view of the packaged catalytic converter 200. As can be seen most clearly in FIG. 3, the ring 202 includes an upper lip 300 and a lower lip 302 that retain the wound or folded ribbon 100 within the ring 202, i.e., the lips 300 and 302 prevent the ribbon 100 from sliding up or down out of the ring 202. I refer to the shape of the ring 202 shown in FIG. 3 as "C-shaped" (in cross section), and I refer to the ring 202 as a "C-shaped ring."

When the packaged catalytic converter 200 is placed in a stack, smoke 304 enters via an opening 306 defined by the lower lip 302. The smoke passes over the surfaces of the ribbon 100 and then exits via a second opening 308 defined by the upper lip 300. The ribbon 100 typically includes a catalytic material adhered to the surface of the ribbon. Components of smoke coming in contact with the catalytic material are combusted, thereby cleaning the smoke.

Figure 4:
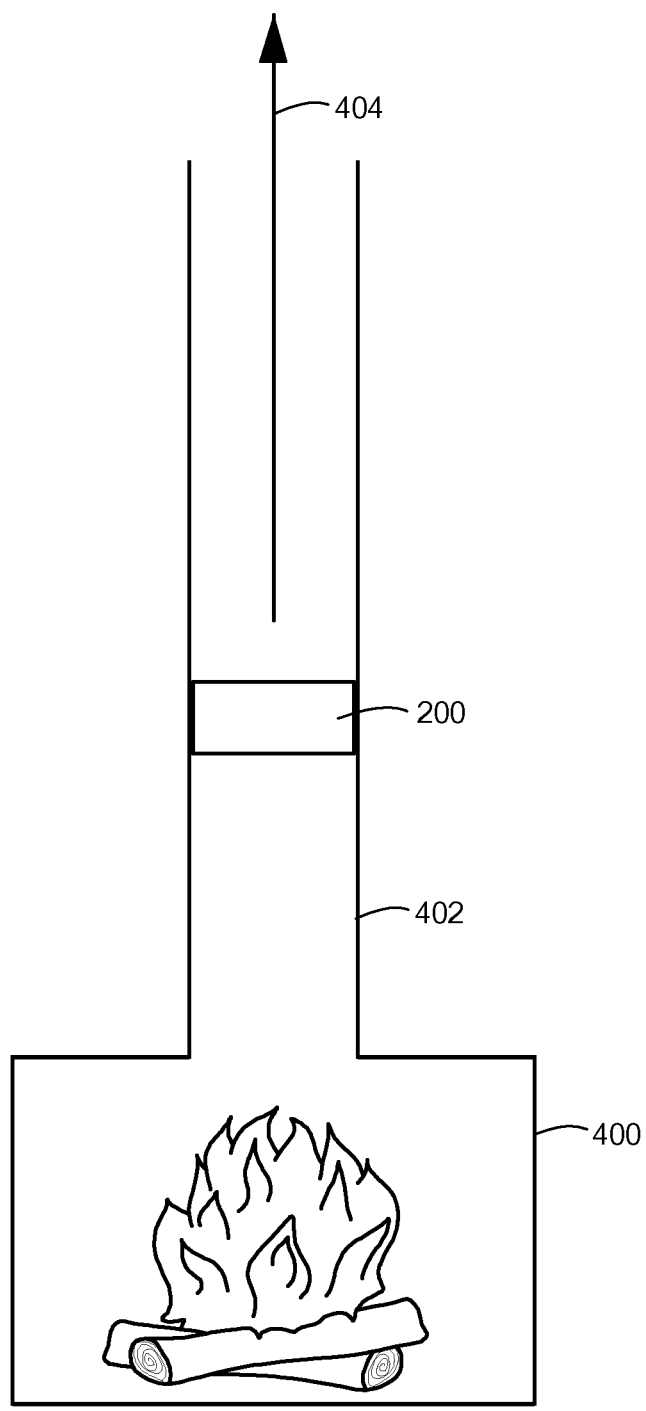
FIG. 4 is a schematic longitudinal cross-sectional view of a wood-burning appliance coupled to a stack that is equipped with a packaged catalytic converter, according to the prior art.

FIG. 4 is a schematic longitudinal cross-sectional view of a wood-burning appliance 400 coupled to a stack 402 that is equipped with a packaged catalytic converter 200, according to the prior art. If an explosion occurs in the wood-burning appliance 400, the packaged catalytic converter 200 may be expelled with great velocity out of the stack 402, as indicated by arrow 404. Clogged catalytic converters are more susceptible to expulsion, because they present more resistance to gas flow than clean catalytic converters. As noted, such explosions have been known to cause catalytic converter packages to be projected up to about 25 feet in the air. A flying catalytic converter can create a hazard to people, animals and property, especially because the ejected catalytic converter is likely to be very hot (on the order of several hundred degrees Fahrenheit), and where such a projected catalytic converter lands is unpredictable.

Figure 5:
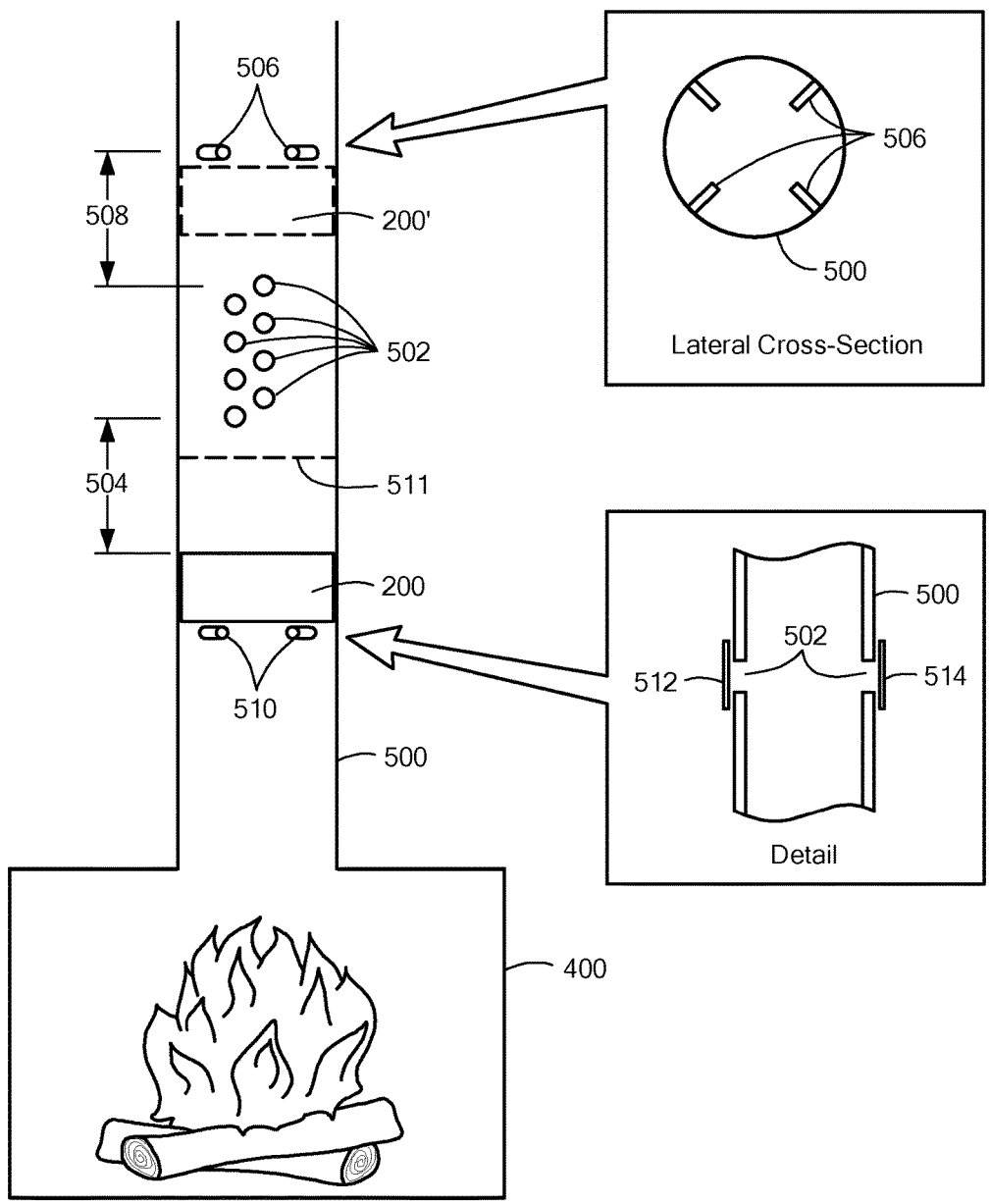
FIG. 5 is a schematic longitudinal cross-sectional view of a wood-burning appliance coupled to a stack that is equipped with a packaged catalytic converter and a safety device, according to an embodiment of the present invention.

Embodiments of the present invention prevent packaged catalytic converters from being expelled from stacks, or at least reduce the velocity with which such a package may be expelled. FIG. 5 is a schematic longitudinal cross-sectional view of an embodiment of the present invention. In this embodiment, the stack 500 includes a wall that defines a plurality of holes (ports) 502 through the wall and positioned a distance 504 above the height of the catalytic converter 200. In case of an explosion that drives the catalytic converter 200 up the stack 500, once the catalytic converter 200 is driven above the height of the ports 502 (as shown in dashed line at 200'), pressure of from the explosion is vented out of the stack 500 by the ports 502, thereby reducing or eliminating the force driving the catalytic converter 200.

Optionally, one or more bars 506 ("top bars") may extend into the interior of the stack 500 to stop the catalytic converter 200 from translating further up the stack 500. The top bars 506 should be located a sufficient distance 508 above the ports 502 to enable the catalytic converter 200 to be driven completely above the ports 502, thereby preventing a driven catalytic converter 200 from blocking the ports 502. The top bars 506 may extend only partially into the interior of the stack 500, as shown in the lateral cross-sectional view in FIG. 5, or some or all of the top bars 506 may extend all the way across the interior (not shown) of the stack 500. In some embodiments, temperature, oxygen or other sensors used by a control system may act as some or all of the top bars 506. The bars should be made of a corrosion-resistant material, such as stainless steel.

After pressure in the stack 500 returns to normal, the catalytic converter 200 may fall back down the stack 500 due to the force of gravity. Optionally, additional bars 510 ("bottom bars") may be disposed in the interior of the stack 500 to define a bottom position for the catalytic converter 200. If the catalytic converter 200 falls back down the stack 500, the bottom bars 510 limit the downward translation of the catalytic converter 200. As with the top bars 506, the bottom bars 510 may extend partially or fully through the interior of the stack 500. However, fewer or smaller in diameter bottom bars 510 may be needed than top bars 506, because the force of an explosion is likely to cause the catalytic converter 200 to strike the top bars 506 with greater force than gravity will cause the catalytic converter 200 to strike bottom bars 510. In some embodiments, temperature, oxygen or other sensors used by a control system may act as some or all of the bottom bars 510. The top bars 506 and the bottom bars 510 form respective stops for travel of the catalytic converter 200 within the stack 500.

Optionally, the stack 500 includes sections of smoke pipe that may be assembled end-to-end to form a desired length of stack, in a well-known manner. The stack 500 may include a joint 511 between two such sections to facilitate inserting the catalytic converter 200. Optionally or alternatively, some or all of the top and/or bottom bars 506 and/or 510 may be threaded or otherwise configured to be removable and replaceable through the wall of the stack 500.

In some embodiments, about seven one-inch diameter ports 502 are defined at least about two feet, preferably about four to eight feet, above the normal position of the catalytic converter 200. Preferably, the ports 502 are arranged in two or more staggered rows, and each row is aligned with the longitudinal axis of the stack 500, i.e., the direction in which the catalytic converter 200 would be translated in case of an explosion. For large stacks 500, such as stacks larger than about 12-inches in diameter, or if a large explosion is possible, more and/or larger ports 502, possibly arranged in more rows, may be defined in the stack 500. Conversely, smaller and/or fewer ports 502 may be used in smaller stacks 500. Ports 502 having diameters between about one-half inch and about three inches may be used in various embodiments. Successive ports 502 may be relatively closely spaced, such as within about one port diameter of the respective preceding port. The number, and/or size and/or spacing of the ports 502 should be selected based on expected pressure inside the stack 500 in case of an explosion.

Under normal operating conditions, a draft inside the stack 500 results in negative pressure at the ports 502, as measured outside the stack 500. Thus, under normal operating conditions, smoke should not exit the stack 500 through the ports 502. However, to prevent the possibility of smoke entering a space occupied by the stack 500, and to prevent (possibly heated) air in the space occupied by the stack 500 from being drawn into the ports 502 and up the stack 500, the ports 502 may be sealed with light-weight material, such as foil or a suitable high-temperature polyester film, attached to the stack 500. The seals should be configured such that the force of an explosion easily bursts the seals blocking all or most of the ports 502.

One embodiment of such a seal 512 is shown in the left side of the detail view in FIG. 5. In this embodiment, the seal 512 may be adhered to the outside surface of the stack 500, so as to prevent low-pressure gas from leaking into or out of the port 502. In other embodiments, the seal may be adhered to the inside surface of the stack 500, or the seal may be attached intermediate the outside and inside surfaces of the stack 500.

Optionally or alternatively, a resilient flap 514 may be attached to the outside surface of the stack 500, as shown in the right side of the detail view in FIG. 5. In its normal position, the flap 514 covers its respective port 502, but during an explosion, the resilience of the flap 514 enables the flap 514 to lift and allow explosion gas to escape via the port 502. After the pressure in the stack 500 returns to normal, the resilience of the flap 514 causes the flap to return to its original position. In some embodiments, absent unusually high pressure inside the stack 500, the flap's resilience forces the flap into sealing engagement with the exterior surface of the stack 500. "Resilient" here means springing back into shape, position, etc., elastic, storing energy of a strained material.

Although muzzle brakes are known in the gun, rifle and artillery arts, gun barrel ports are used for an entirely different purpose than the ports 502 described herein. Gun barrel ports are used to reduce recoil and/or muzzle rise as a result of firing a weapon. Gun barrels are designed to project bullets, etc. In contrast, smoke stacks are not designed to project catalytic converters, and such action is highly undesirable. Gun barrel ports would be useless if they released sufficient gas pressure to prevent a fired bullet from exiting the barrel with sufficient velocity to travel a great distance. On the other hand, my ports 502 are designed to do exactly the opposite of gun ports, i.e., my ports 502 are designed to release sufficient gas pressure to prevent a catalytic converter from being ejected from a stack, or at least significantly reducing the velocity of such an ejection. Thus, if anything, the gun, rifle and artillery arts teach away from my ports 502.

Figure 6:
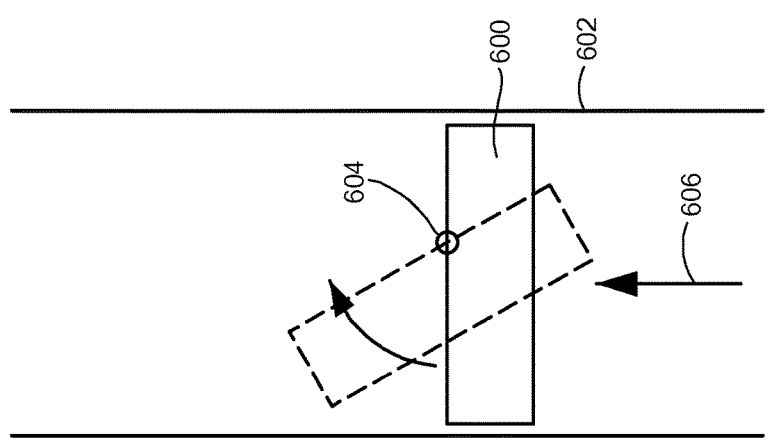
FIG. 6 is a schematic longitudinal cross-sectional view of a hinged safety device, according to another embodiment of the present invention.

FIG. 6 is a schematic longitudinal cross-sectional view of another embodiment of the present invention. A packaged catalytic converter 600 is mounted in a stack 602 via a hinge, such as a pin, 604, preferably made of stainless steel or another corrosion resistant material. During normal operation, the catalytic converter 600 occupies the position shown in solid line. However, if an explosion causes a sudden force 606 to be exerted on the catalytic converter 600, the catalytic converter 600 pivots about the hinge 604, such as to a position shown in dashed line. Once the force 606 ceases, gravity urges the catalytic converter 600 to pivot back to its original position.

Figure 7:
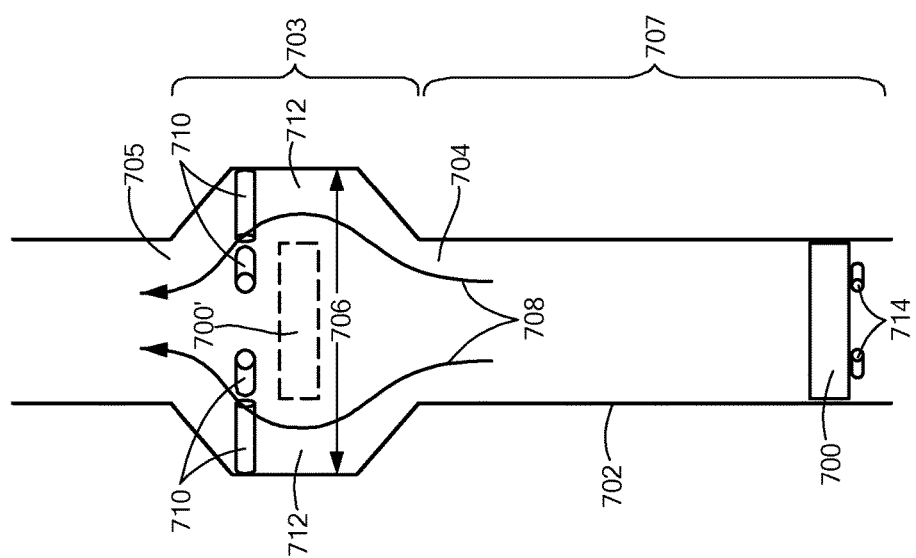
FIG. 7 is a schematic longitudinal cross-sectional view of a portion of a stack having an enlarged section safety device, according to yet another embodiment of the present invention.

FIG. 7 is a schematic longitudinal cross-sectional view of yet another embodiment of the present invention. A packaged catalytic converter 700 is disposed in a stack 702. The stack 702 defines an enlarged portion 703 that has an inlet 704 and an outlet 705. The enlarged portion 703 has a larger inside diameter 706 than the inside diameter of the inlet 704 or the outlet 705. More specifically, the enlarged portion 703 has a larger inside diameter 706 than the inside diameter of the portion 707 of the stack 702 in which the catalytic converter 700 is disposed under normal operation. The enlarged portion 703 has a larger cross-sectional area than the inlet 704, the outlet 705 or the portion 707 of the stack 702.

Thus, in case the catalytic converter 700 is driven up the stack 702 by rushing gas from an explosion, after the catalytic converter 700 reaches the enlarged portion 703 of the stack 702 (as shown in dash line at 700'), the gas bypasses the catalytic converter 700', as indicated by arrows 708, thereby relieving pressure on the catalytic converter 700'. After the pressure of the gas subsides, the catalytic converter 700 may fall back into its original position, or at least back to the bottom of the enlarged portion 703.

In some embodiments, the cross-sectional area of the enlarged portion 703 is at least twice as large as the cross-sectional area of the inlet 704, so even if the catalytic converter 700' is completely clogged and it is driven into the enlarged portion 703, the available cross-sectional area in the enlarged portion 703 remains at least equal to the cross-sectional area of the stack 702.

Optionally, one or more top bars 710 are disposed within the interior of the enlarged portion 704 of the stack 702 to inhibit the catalytic converter 700 from reaching the top portion of the enlarged portion 703, or at least from exiting the enlarged portion 703. Preferably, the enlarged portion 703 and the top bars 710 are sized and configured such that, if the catalytic converter 700 is driven up against the top bars 710, the remaining cross-sectional area 712 around the catalytic converter 700' is at least as great as the cross-sectional area of the portion 707 of the stack 702. The top bars 710 therefore preserve enough cross-sectional area of the enlarged portion 703 to allow the explosion gas to bypass the catalytic converter 700'. Although all the top bars 710 are shown in FIG. 7 as lying in a single plane, in other embodiments, the top bars 710 may lie in more than one plane.

In general, there are enough top bars 710, and they are positioned within the interior of the enlarged portion 703, so as to define no space within the interior, i.e., between the top bars 710, or between the top bars 710 and the inside wall of the enlarged portion 703, through which the catalytic converter 700' can pass. Generally, the catalytic converter has a diameter slightly less than the inside diameter of the stack 702 and the inside diameter of the inlet 704. Of course, the stack 702 and the inlet 704 may have shapes other than circular. In any case, there are enough top bars 710, and they are positioned within the interior of the enlarged portion 703, so as to define no space within the interior through which an object having a dimension equal to the largest inside diameter of the inlet 704 can pass from the inlet 704 to the outlet 705.

Other aspects of the top bars 710 are similar to the top bars 506 discussed above, with respect to FIG. 5. Bottom bars 714 may also be included, as discussed above, with respect to FIG. 5

Figure 8:
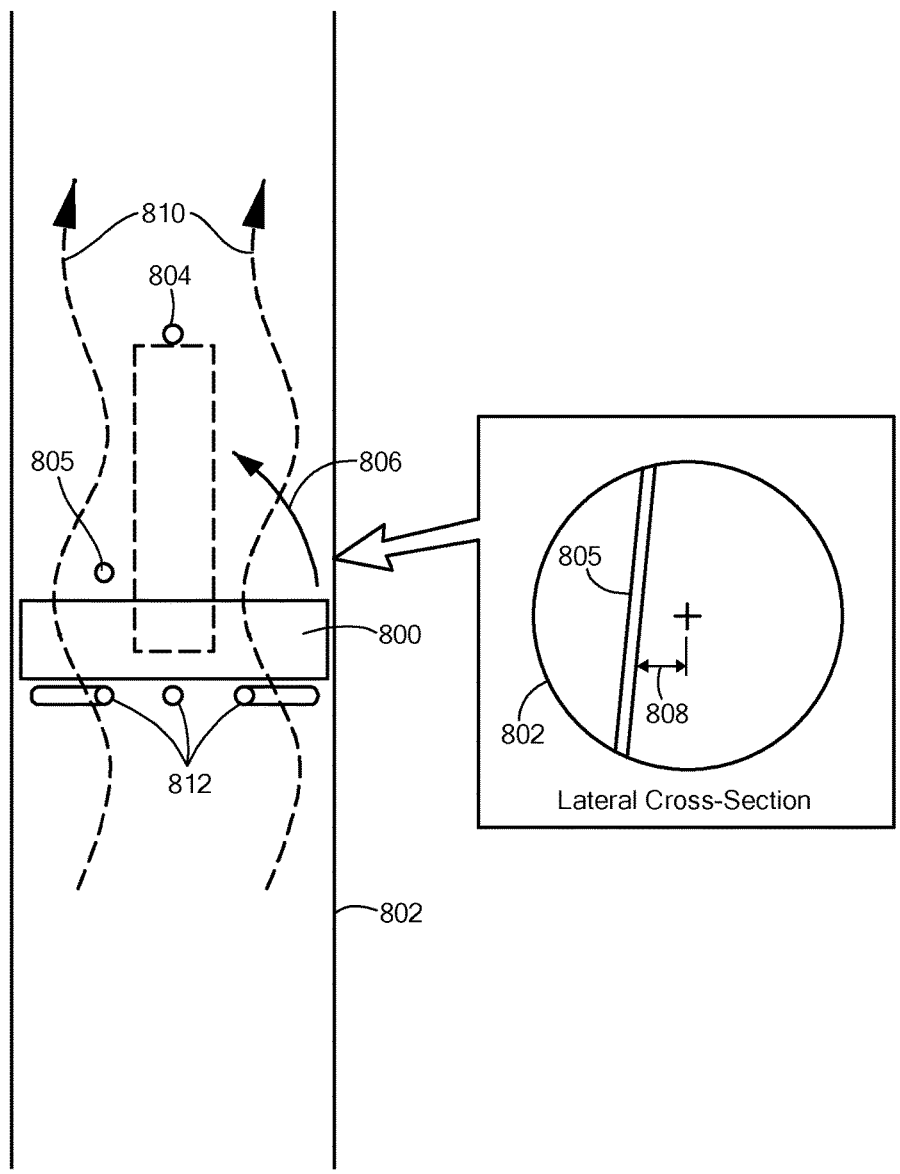
FIG. 8 is a schematic longitudinal cross-sectional view of a stack equipped with a packaged catalytic converter and a safety device, according to another embodiment of the present invention.

FIG. 8 is a schematic longitudinal cross-sectional view of another embodiment of the present invention. A packaged catalytic converter 800 is disposed in a stack 802 as shown in solid line. One or more top bars, preferably made of stainless steel or another corrosion resistant material, exemplified by bars 804 and 805, extend at least part way through the interior volume of the stack 802. The bars 804-805 are positioned, relative to the catalytic converter 800, such that if the catalytic converter 800 is driven up, the catalytic converter 800 strikes at least one of the bars 804-805, causing the catalytic converter 800 to pivot as shown by arrow 806. For example, at least one of the bars 805 may be disposed a lateral distance 808 off-center within the stack 802, as shown in the lateral cross-sectional view in FIG. 8. One or more of the bars 804-805 (such as top bar 804) or a separate grate (not shown), also preferably made of stainless steel or another corrosion resistant material, is positioned so as to prevent the catalytic converter 800 from traveling further up the stack 802. Once the catalytic converter 800 has pivoted, gas can bypass the catalytic converter 800, as indicated by arrows 810. After the pressure of the gas subsides, the catalytic converter 800 may fall back into its original position. Bottom bars 812 may be included to facilitate the catalytic converter 800 returning to its original position, as discussed above with respect to FIG. 5.

Optionally or alternatively, a single bar may be bent so one portion of the bent bar is disposed as shown for bar 804 and another portion of the bar is disposed as shown for bar 805. In this context, the two portions of the bar are referred to herein as separate bars. Optionally or alternatively, the bars 804-805 may be replaced by a grate (not shown) shaped and positioned to cause the catalytic converter 800 to pivot and stop traveling up the stack 802, as described with respect to the bars 804. In this context, a bar herein means a bar or a grate.

Optionally or alternatively, as shown in FIG. 9, the stack 900 may be equipped with a cap 902. In most cases, the cap 902 prevents the catalytic converter 904 from being ejected from the stack 900, in case of an explosion. Instead, the catalytic converter 904 strikes the bottom of the cap 902 (as shown in dashed line at 904'). Once the catalytic converter 904' is out of the stack 900, explosion gas may easily escape, as indicated by arrows 906. Eventually, the catalytic converter 904' may falls back down the stack 900, possibly as far as its original position. The top of the stack 900 may be flared to facilitate re-entry by the catalytic converter 904'. Bottom bars 908 may be included, as discussed above with respect to FIG. 5.

Even if the catalytic converter 904 is driven by an explosion with sufficient force to break through the cap 902 or to dislodge the cap 902 from the stack 900, the moving catalytic converter 904 loses some energy when it strikes the cap 902, thereby slowing the catalytic converter 904 and reducing the likelihood that the catalytic converter 904 will exit the stack 900 with great velocity and cause damage. However, the cap 902 is preferably configured to withstand an expected impact from the driven catalytic converter 904 as a result of an explosion, without allowing the driven catalytic converter 904 to exit the stack 900 or dislodge the cap 902 from the stack 900. For example, the cap 902 may be fixed to the top of the stack 900 with fasteners, rather than merely friction-fit to the top of the stack 900. Preferably, the normal position of the catalytic converter 904 is a distance 910 of at least about four feet from the cap 902, although other distances may be used.

FIG. 10 is a schematic longitudinal cross-sectional view of yet another embodiment of the present invention. A packaged catalytic converter 1000 is disposed in a stack 1002. The stack 1002 is equipped with a pivoted cap 1004. The cap 1004 pivots about a hinge, such as a pin, 1006. In the normal operating position of the cap (shown in solid line), the cap allows smoke to exit the stack 1002, as indicated by arrow 1008. However, in case of an explosion that drives the catalytic converter 1000 up the stack and causes the catalytic converter 1000 to strike the cap 1004, the cap 1004 pivots, as shown by arrow 1010, such as to the position shown in dashed line. Pivoting the cap 1004 causes the catalytic converter 1000 to lose some energy, possibly preventing the catalytic converter 1000 from exiting the stack 1002. Thus, in most cases, the cap 1004 prevents the catalytic converter 1000 from being ejected from the stack 1002, in case of an explosion. Instead, the catalytic converter 1000 strikes the bottom of the cap 1004 and may eventually fall back down the stack 1002, possibly as far as its original position. Bottom bars 1012 may be included, as discussed above with respect to FIG. 5.

Even if the catalytic converter 1000 is driven by an explosion with sufficient force to pivot the cap 1004 to a fully-open position or to dislodge the cap 1004 from the stack 1002, the moving catalytic converter 1000 loses some energy when it strikes the cap 1004, thereby slowing the catalytic converter 1000 and reducing the likelihood that the flying catalytic converter 1000 will cause damage. Preferably, the normal position of the catalytic converter 1000 is a distance 1014 at least about four feet from the cap 1004, although other distances may be used.

Figure 11:
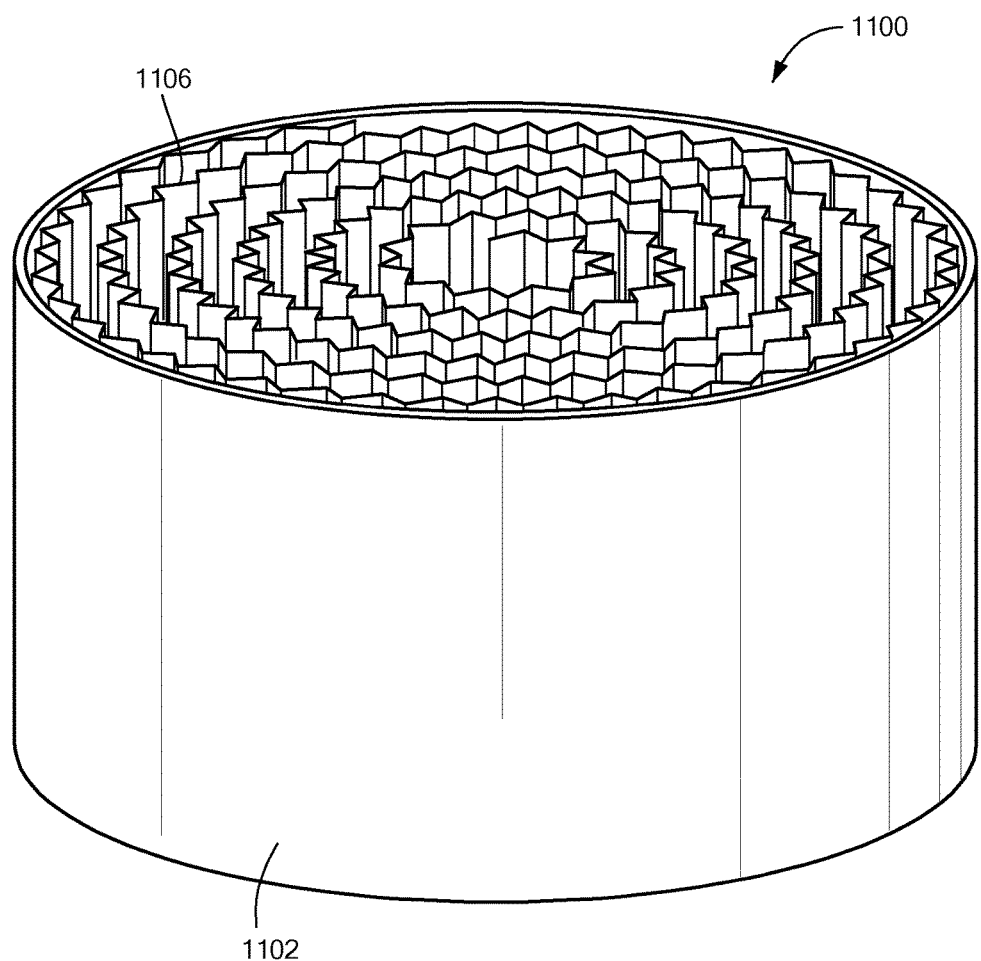
FIG. 11 is a perspective view of a packaged catalytic converter with an integral safety device, according to yet another embodiment of the present invention.
Figure 12:
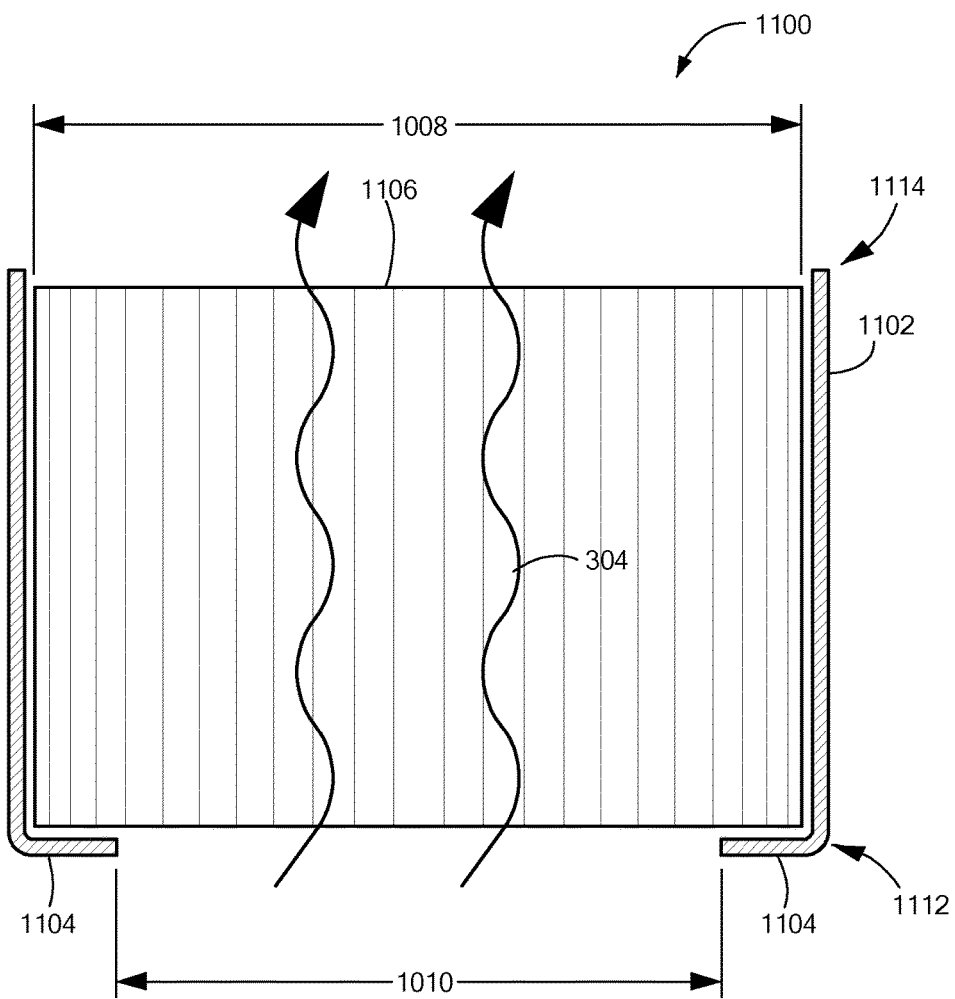
FIG. 12 is a schematic longitudinal cross-sectional view of the packaged catalytic converter of FIG. 11.

FIG. 11 is a perspective side view, and FIG. 12 is a schematic longitudinal cross-sectional view, of a packaged catalytic converter 1100, according to another embodiment of the present invention. The packaged catalytic converter 1100 includes a ring 1102 with a bottom inwardly-oriented lip 1104 to prevent a wound or folded ribbon 1006 from falling out the bottom of the ring 1102, while the ring is in place in a stack (not shown). The outside diameter 1008 of the wound or folded ribbon 1006 is larger than the inside diameter 1010 of an opening defined by the lip 1104. However, the ring 1102 does not include a top lip. I refer to the shape of the ring 1102 shown in FIG. 11 as an "L-shape" (in cross section), and I refer to the ring 1102 as an "L-shaped ring." Thus, in case of an explosion below the catalytic converter 1100, instead of ejecting the entire packaged catalytic converter 1100 from a stack, the ribbon 1006 may be ejected from the ring 1102. Ejecting the ribbon 1006 from the ring 1102 reduces the resistance to gas flow presented by the catalytic converter 1100. Thus, the ring 1102 may remain in place or at least not translate as far up the stack as would a conventional packaged catalytic converter.

I refer to the ring 1102 as having two ends, namely a bottom end 1112, from which the lip 1104 extends, and a top end 1114, which has no lip. The ring 1102 can also be referred to as a tube with two ends. Although a circular cross-sectional ring 1102 has been described, the ring may be formed in other cross-sectional shapes, such as to match cross-sectional shapes of interiors of stacks or mounting brackets within stacks.

Many prior art packaged catalytic converters include rivets, wires or other structures to bind the ribbons and prevent the ribbons from unwinding. However, preferably, the ribbon 1006 is not bound, except by the ring 1102.

Figure 13:
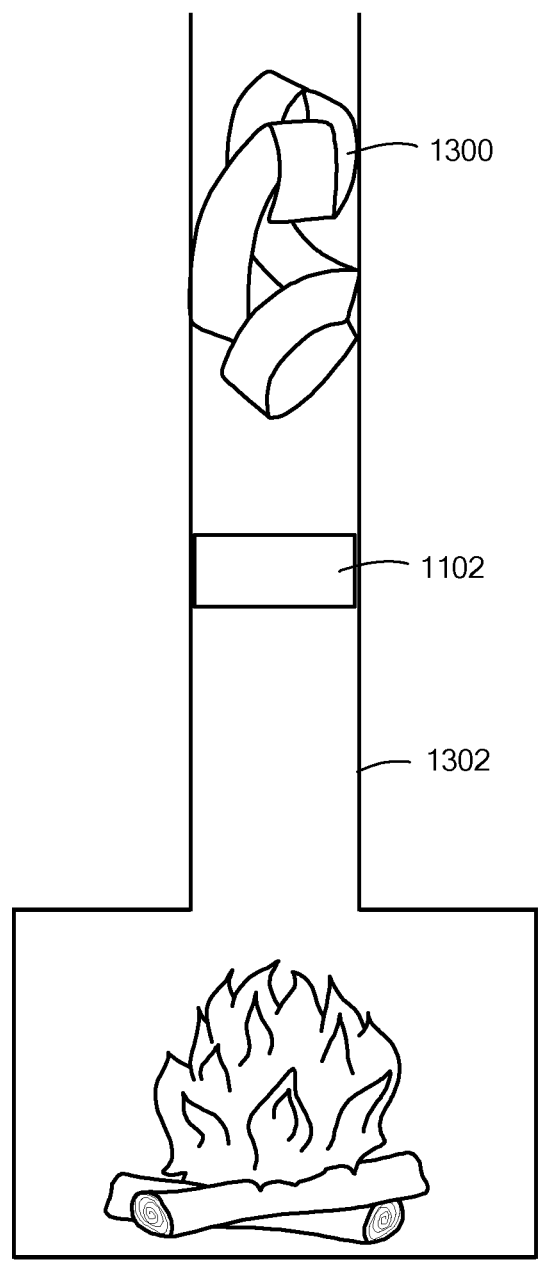
FIG. 13 is a schematic longitudinal cross-sectional view of a stack equipped the packaged catalytic converter of FIGS. 11 and 12, after the catalytic converter deployed the safety device.

As shown in FIG. 13, an ejected ribbon 1300 is very likely to uncoil or unfold within a stack 1302. Uncoiling of the ribbon 1300 absorbs some of the energy of the explosion. In addition, the uncoiled ribbon 1300 is likely to become less tightly packed, therefore present less resistance to the flow of gas in the stack 1302. Consequently, the gas exerts less force tending to eject the uncoiled ribbon 1300 from the stack 1302. Furthermore, much of the uncoiled ribbon 1300 is likely to come into contact with the inside surface of the stack 1302. Friction from this contact inhibits translation of the uncoiled ribbon 1300 further up the stack 1302. It should be noted that, even if the ribbon 1300 is ejected from the ring 1102, while the ribbon 1300 remains in the stack 1302, the ribbon 1300 continues to function as a catalyst for smoke passing through the stack 1302.

The cap 902 and/or the cap 1004, described above, may be used in combination with any of the other embodiments described above. Similarly, the other embodiments may be combined. For example, the embodiments shown in FIGS. 5 and 7 may be combined.

While specific values chosen for some embodiments are recited, it is to be understood that, within the scope of the invention, values of all of parameters may vary over wide ranges to suit different applications.

While the invention is described through the above-described exemplary embodiments, it will be understood by those of ordinary skill in the art that modifications to, and variations of, the illustrated embodiments may be made without departing from the inventive concepts disclosed herein. Furthermore, disclosed aspects, or portions of these aspects, may be combined in ways not listed above. Accordingly, the invention should not be viewed as being limited to the disclosed embodiments.

What is claimed is:

1. A safety device for preventing expulsion of a catalytic converter, the safety device comprising:
   a smoke pipe having an inlet end and an outlet end and defining an interior and a smoke pipe interior cross-sectional area; and
   a gas bypass portion devoid of any catalytic converter attached thereto, the gas bypass portion comprising:
      an inlet coupled to the outlet end of the smoke pipe and defining an inlet internal cross-sectional area equal to the smoke pipe internal cross-sectional area;
      an outlet defining an outlet internal cross-sectional area; and
      a middle portion between the inlet and the outlet of the gas bypass portion and defining a middle internal cross-sectional area greater than the inlet internal cross-sectional area and greater than the outlet internal cross-sectional area, the gas bypass portion being configured such that gas flows sequentially through the smoke pipe, then through the inlet of the gas bypass portion, then through the middle portion of the gas bypass portion and then through the outlet of the gas bypass portion;
   wherein the smoke pipe has a cross-sectional shape sufficiently large to accept a catalytic converter propelled by explosion gas, such that the catalytic converter is free to travel longitudinally within the interior of the smoke pipe and into the gas bypass portion, the gas bypass portion being configured to bypass the explosion gas around the catalytic converter and prevent expulsion of the catalytic converter from the outlet.

2. A safety device according to claim 1, wherein the middle portion defines an internal cross-sectional area at least twice the inlet internal cross-sectional area.

3. A safety device according to claim 1, wherein:
   the inlet has an inside diameter; and
   the gas bypass portion defines an interior; and
   the safety device further comprises at least one first bar disposed in the interior of the gas bypass portion, the at least one first bar collectively defining no space within the interior of the gas bypass portion through which an object having a dimension equal to the inside diameter of the inlet can pass from the inlet to the outlet.

4. A safety device according to claim 3, wherein:
   the smoke pipe defines an interior; and
   the safety device further comprises at least one second bar disposed in the interior of the smoke pipe, upstream of any catalytic converter.

5. A smoke pipe comprising:
   an upstream portion having an inlet end and an outlet end and defining an interior and an upstream interior cross-sectional area;
   a downstream portion that defines an interior and comprises:
      an inlet coupled to the outlet end of the upstream portion;
      an outlet that defines an end of the smoke pipe opposite the inlet end of the upstream portion; and
      a middle portion between the inlet and the outlet and that defines a middle interior cross-sectional area greater than the interior cross-sectional area of the upstream portion, wherein the interior of the upstream portion and the interior of the downstream portion collectively define an interior of the smoke pipe, the gas bypass portion being configured such that gas flows sequentially through the upstream portion, then through the inlet of the downstream portion, then through the middle portion of the downstream portion and then through the outlet of the downstream portion;
   a first obstruction disposed in the interior of the upstream portion;
   a second obstruction disposed in the interior of the downstream portion; and
   a catalytic converter disposed in the interior of the smoke pipe, downstream of the first obstruction, upstream of the second obstruction and free to travel longitudinally within the interior of the smoke pipe between the first obstruction and the second obstruction;
   wherein the first obstruction is configured to prevent travel of the catalytic converter beyond the first obstruction toward the inlet end of the upstream portion, the second obstruction is configured to prevent travel of the catalytic converter beyond the second obstruction toward the outlet of the downstream portion and the first and second obstructions are configured to permit travel of the catalytic converter from the upstream portion into the middle portion.

6. A smoke pipe according to claim 5, wherein the downstream portion is configured to bypass explosion gas around the catalytic converter.

7. A smoke pipe according to claim 5, wherein the middle interior cross-sectional area is at least twice the upstream interior cross-sectional area.

8. A smoke pipe according to claim 5, wherein:
   the first obstruction comprises at least one first bar; and
   the second obstruction comprises at least one second bar.

9. A smoke pipe according to claim 5, wherein the downstream portion is devoid of any catalytic converter attached thereto.

* * * * *